United States Patent
Qiu et al.

(10) Patent No.: US 12,453,774 B2
(45) Date of Patent: Oct. 28, 2025

(54) TUMOR IMMUNOTHERAPY POLYPEPTIDE AND APPLICATION THEREOF

(71) Applicant: GENOIMMUNE THERAPEUTICS CO., LTD., Hubei (CN)

(72) Inventors: Si Qiu, Hubei (CN); Bo Li, Hubei (CN); Youping Li, Hubei (CN); Le Zhang, Hubei (CN)

(73) Assignee: GENOIMMUNE THERAPEUTICS CO., LTD., Wuhan (CN)

( * ) Notice: Subject to any disclaimer, the term of this patent is extended or adjusted under 35 U.S.C. 154(b) by 699 days.

(21) Appl. No.: 17/774,872

(22) PCT Filed: Nov. 7, 2019

(86) PCT No.: PCT/CN2019/116166
§ 371 (c)(1),
(2) Date: May 6, 2022

(87) PCT Pub. No.: WO2021/087840
PCT Pub. Date: May 14, 2021

(65) Prior Publication Data
US 2022/0378887 A1 Dec. 1, 2022

(51) Int. Cl.
A61K 40/42 (2025.01)
A61K 40/11 (2025.01)
A61K 40/19 (2025.01)
A61K 40/24 (2025.01)
A61P 35/00 (2006.01)

(52) U.S. Cl.
CPC ............. *A61K 40/42* (2025.01); *A61K 40/11* (2025.01); *A61K 40/19* (2025.01); *A61K 40/24* (2025.01); *A61P 35/00* (2018.01); *A61K 2239/31* (2023.05); *A61K 2239/38* (2023.05); *A61K 2239/55* (2023.05)

(58) Field of Classification Search
CPC ............ A61K 39/4644; A61K 39/4611; A61K 39/4615; A61K 39/4622; A61K 2239/31; A61K 2239/38; A61K 2239/55; A61K 2039/572; A61K 38/08; A61K 38/17; A61P 35/00; C07K 7/06; C07K 14/82; C12N 5/10; C12N 15/63
See application file for complete search history.

(56) References Cited

U.S. PATENT DOCUMENTS

| | | | |
|---|---|---|---|
| 5,679,641 A | 10/1997 | Melief et al. | |
| 2019/0099475 A1 | 4/2019 | Benz et al. | |
| 2019/0279742 A1 | 9/2019 | Bulik-Sullivan et al. | |
| 2022/0143063 A1* | 5/2022 | Seidel, III | C07K 14/70539 |

FOREIGN PATENT DOCUMENTS

| | | |
|---|---|---|
| CN | 105980403 A | 9/2016 |
| CN | 107223134 A | 9/2017 |
| CN | 107922472 A | 4/2018 |
| CN | 108137685 A | 6/2018 |
| CN | 108395479 A | 8/2018 |
| CN | 110214275 A | 9/2019 |
| WO | 9953061 A2 | 10/1999 |
| WO | 2018145020 A1 | 8/2018 |

OTHER PUBLICATIONS

Hu Z et al. Towards personalized, tumour-specific, therapeutic vaccines for cancer. Nature Reviews Immunology 2018 18, 168-182 (Year: 2018).*
Rock KL et al. Present Yourself! By MHC Class I and MHC Class II Molecules. Trends Immunol. 2016 37(11):724-737 (Year: 2016).*
Cafri G et al. Memory T cells targeting oncogenic mutations detected in peripheral blood of epithelial cancer patients. (Nature Communications 2019 10 449 1-9) (Year: 2019).*
Butterfield LH et al. Adenovirus MART-1-engineered Autologous Dendritic Cell Vaccine for Metastatic Melanoma. (J Immunother. Apr. 2008;31(3):294-309) (Year: 2008).*
Wang QJ et al. Identification of T-cell Receptors Targeting KRAS-Mutated Human Tumors. (Cancer Immunol Res (2016) 4 (3): 204-214) (Year: 2016).*
NetMHC (https://services.healthtech.dtu.dk/services/NetMHC-4.0/) (Year: 2024).*
Alberts B et al. Molecular Biology of the Cell. 4th edition. 2002 (https://www.ncbi.nlm.nih.gov/books/NBK26821/) (Year: 2002).*
Garcia-Garijo A et al. Determinants for Neoantigen Identification. (Frontiers in Immunology Oct. 1-19, 2019) (Year: 2019).*
Translated Chinese First Office Action, App. No. 201980102083.6, dated Aug. 5, 2023, pp. 1-17.

* cited by examiner

*Primary Examiner* — Karen A. Canella
*Assistant Examiner* — John J Skoko, III
(74) *Attorney, Agent, or Firm* — BOND, SCHOENECK & KING, PLLC; George R. McGuire

(57) ABSTRACT

Provided are a polypeptide for tumor immunotherapy and use thereof. The polypeptide includes at least one polypeptide in a first peptide group, and optionally, at least one polypeptide in a second peptide group, the first peptide group includes polypeptides having amino acid sequences set forth in SEQ ID NO: 1 to SEQ ID NO: 6, and first derivative peptides thereof, and the second peptide group includes polypeptides having amino acid sequences set forth in SEQ ID NO: 7 to SEQ ID NO: 15, and second derivative peptides thereof. Further provided are an isolated nucleic acid, a construct, an expression vector, a host cell, a pharmaceutical composition, an antigen-presenting cell, an immune effector cell, a tumor vaccine, use of the polypeptide in the preparation of drugs for preventing or treating tumors, and a method for treating a patient suffering from tumors.

15 Claims, 5 Drawing Sheets
Specification includes a Sequence Listing.

SEQUENCE LISTING

```
<160> NUMBER OF SEQ ID NOS: 30

<210> SEQ ID NO 1
<211> LENGTH: 10
<212> TYPE: PRT
<213> ORGANISM: Artificial Sequence
<220> FEATURE:
<223> OTHER INFORMATION: Core polypeptide

<400> SEQUENCE: 1

Val Thr Val Gly Ala Asp Gly Val Gly Lys
1               5                   10

<210> SEQ ID NO 2
<211> LENGTH: 10
<212> TYPE: PRT
<213> ORGANISM: Artificial Sequence
<220> FEATURE:
<223> OTHER INFORMATION: Core polypeptide

<400> SEQUENCE: 2

Val Thr Val Gly Ala Arg Gly Val Gly Lys
1               5                   10

<210> SEQ ID NO 3
<211> LENGTH: 9
<212> TYPE: PRT
<213> ORGANISM: Artificial Sequence
<220> FEATURE:
<223> OTHER INFORMATION: Core polypeptide

<400> SEQUENCE: 3
```

```
Val Thr Gly Ala Val Gly Val Gly Lys
1               5
```

<210> SEQ ID NO 4
<211> LENGTH: 10
<212> TYPE: PRT
<213> ORGANISM: Artificial Sequence
<220> FEATURE:
<223> OTHER INFORMATION: Core polypeptide

<400> SEQUENCE: 4

```
Val Thr Val Gly Ala Val Gly Val Gly Lys
1               5                   10
```

<210> SEQ ID NO 5
<211> LENGTH: 10
<212> TYPE: PRT
<213> ORGANISM: Artificial Sequence
<220> FEATURE:
<223> OTHER INFORMATION: Core polypeptide

<400> SEQUENCE: 5

```
Val Thr Val Gly Ala Ala Gly Val Gly Lys
1               5                   10
```

<210> SEQ ID NO 6
<211> LENGTH: 10
<212> TYPE: PRT
<213> ORGANISM: Artificial Sequence
<220> FEATURE:
<223> OTHER INFORMATION: Core polypeptide

<400> SEQUENCE: 6

```
Val Ser Val Gly Ala Val Gly Val Gly Lys
1               5                   10
```

<210> SEQ ID NO 7
<211> LENGTH: 10
<212> TYPE: PRT
<213> ORGANISM: Artificial Sequence
<220> FEATURE:
<223> OTHER INFORMATION: High-frequency mutant polypeptide

<400> SEQUENCE: 7

```
Ser Thr Ile Asp Glu Ser Pro Ile Phe Lys
1               5                   10
```

<210> SEQ ID NO 8
<211> LENGTH: 9
<212> TYPE: PRT
<213> ORGANISM: Artificial Sequence
<220> FEATURE:
<223> OTHER INFORMATION: High-frequency mutant polypeptide

<400> SEQUENCE: 8

```
Arg Thr Ile Glu Gln Leu Thr Leu Lys
1               5
```

<210> SEQ ID NO 9
<211> LENGTH: 9
<212> TYPE: PRT
<213> ORGANISM: Artificial Sequence
<220> FEATURE:
<223> OTHER INFORMATION: High-frequency mutant polypeptide

<400> SEQUENCE: 9

```
Thr Thr Ala Pro Phe Leu Ser Gly Lys
```

```
1               5

<210> SEQ ID NO 10
<211> LENGTH: 10
<212> TYPE: PRT
<213> ORGANISM: Artificial Sequence
<220> FEATURE:
<223> OTHER INFORMATION: High-frequency mutant polypeptide

<400> SEQUENCE: 10

Lys Leu Gln Glu Ser Gly Asp Val Pro Val
1               5                   10

<210> SEQ ID NO 11
<211> LENGTH: 10
<212> TYPE: PRT
<213> ORGANISM: Artificial Sequence
<220> FEATURE:
<223> OTHER INFORMATION: High-frequency mutant polypeptide

<400> SEQUENCE: 11

Thr Tyr Gln Asn Asp Asn Lys Pro Glu Phe
1               5                   10

<210> SEQ ID NO 12
<211> LENGTH: 9
<212> TYPE: PRT
<213> ORGANISM: Artificial Sequence
<220> FEATURE:
<223> OTHER INFORMATION: High-frequency mutant polypeptide

<400> SEQUENCE: 12

Ala Leu Gln Pro Leu Gln Pro His Ala
1               5

<210> SEQ ID NO 13
<211> LENGTH: 9
<212> TYPE: PRT
<213> ORGANISM: Artificial Sequence
<220> FEATURE:
<223> OTHER INFORMATION: High-frequency mutant polypeptide

<400> SEQUENCE: 13

Ser Tyr Leu Asp Ser Gly Ile His Phe
1               5

<210> SEQ ID NO 14
<211> LENGTH: 11
<212> TYPE: PRT
<213> ORGANISM: Artificial Sequence
<220> FEATURE:
<223> OTHER INFORMATION: High-frequency mutant polypeptide

<400> SEQUENCE: 14

Thr Leu Glu Asp Ser Ser Gly Asn Leu Leu Val
1               5                   10

<210> SEQ ID NO 15
<211> LENGTH: 10
<212> TYPE: PRT
<213> ORGANISM: Artificial Sequence
<220> FEATURE:
<223> OTHER INFORMATION: High-frequency mutant polypeptide

<400> SEQUENCE: 15

Val Val Val Gly Ala Gly Asp Val Gly Lys
1               5                   10
```

<210> SEQ ID NO 16
<211> LENGTH: 26
<212> TYPE: PRT
<213> ORGANISM: Artificial Sequence
<220> FEATURE:
<223> OTHER INFORMATION: Derivative peptide

<400> SEQUENCE: 16

Met Thr Glu Tyr Lys Leu Val Thr Val Gly Ala Asp Gly Val Gly Lys
1               5                   10                  15

Ser Ala Leu Thr Ile Gln Leu Ile Gln Asn
            20                  25

<210> SEQ ID NO 17
<211> LENGTH: 26
<212> TYPE: PRT
<213> ORGANISM: Artificial Sequence
<220> FEATURE:
<223> OTHER INFORMATION: Derivative peptide

<400> SEQUENCE: 17

Met Thr Glu Tyr Lys Leu Val Thr Val Gly Ala Arg Gly Val Gly Lys
1               5                   10                  15

Ser Ala Leu Thr Ile Gln Leu Ile Gln Asn
            20                  25

<210> SEQ ID NO 18
<211> LENGTH: 26
<212> TYPE: PRT
<213> ORGANISM: Artificial Sequence
<220> FEATURE:
<223> OTHER INFORMATION: Derivative peptide

<400> SEQUENCE: 18

Met Thr Glu Tyr Lys Leu Val Thr Val Gly Ala Val Gly Val Gly Lys
1               5                   10                  15

Ser Ala Leu Thr Ile Gln Leu Ile Gln Asn
            20                  25

<210> SEQ ID NO 19
<211> LENGTH: 26
<212> TYPE: PRT
<213> ORGANISM: Artificial Sequence
<220> FEATURE:
<223> OTHER INFORMATION: Derivative peptide

<400> SEQUENCE: 19

Met Thr Glu Tyr Lys Leu Val Thr Val Gly Ala Val Gly Val Gly Lys
1               5                   10                  15

Ser Ala Leu Thr Ile Gln Leu Ile Gln Asn
            20                  25

<210> SEQ ID NO 20
<211> LENGTH: 26
<212> TYPE: PRT
<213> ORGANISM: Artificial Sequence
<220> FEATURE:
<223> OTHER INFORMATION: Derivative peptide

<400> SEQUENCE: 20

Met Thr Glu Tyr Lys Leu Val Thr Val Gly Ala Ala Gly Val Gly Lys
1               5                   10                  15

Ser Ala Leu Thr Ile Gln Leu Ile Gln Asn 20                  25

<210> SEQ ID NO 21
<211> LENGTH: 26
<212> TYPE: PRT
<213> ORGANISM: Artificial Sequence
<220> FEATURE:
<223> OTHER INFORMATION: Derivative peptide

<400> SEQUENCE: 21

Met Thr Glu Tyr Lys Leu Val Ser Val Gly Ala Val Gly Val Gly Lys
1               5                   10                  15

Ser Ala Leu Thr Ile Gln Leu Ile Gln Asn
            20                  25

<210> SEQ ID NO 22
<211> LENGTH: 27
<212> TYPE: PRT
<213> ORGANISM: Artificial Sequence
<220> FEATURE:
<223> OTHER INFORMATION: Derivative peptide

<400> SEQUENCE: 22

Asn Gln Leu Gln Leu Leu Ser Thr Ile Asp Glu Ser Pro Ile Phe Lys
1               5                   10                  15

Glu Phe Val Lys Arg Trp Lys Ser Tyr Leu Lys
            20                  25

<210> SEQ ID NO 23
<211> LENGTH: 27
<212> TYPE: PRT
<213> ORGANISM: Artificial Sequence
<220> FEATURE:
<223> OTHER INFORMATION: Derivative peptide

<400> SEQUENCE: 23

Pro Pro Ser Leu Ala Leu Arg Asp Val Gly Met Ile Phe Arg Thr Ile
1               5                   10                  15

Glu Gln Leu Thr Leu Lys Leu Asn Arg Leu Lys
            20                  25

<210> SEQ ID NO 24
<211> LENGTH: 27
<212> TYPE: PRT
<213> ORGANISM: Artificial Sequence
<220> FEATURE:
<223> OTHER INFORMATION: Derivative peptide

<400> SEQUENCE: 24

Asp Ser Gly Ile His Ser Gly Ala Thr Thr Thr Ala Pro Phe Leu Ser
1               5                   10                  15

Gly Lys Gly Asn Pro Glu Glu Glu Asp Val Asp
            20                  25

<210> SEQ ID NO 25
<211> LENGTH: 27
<212> TYPE: PRT
<213> ORGANISM: Artificial Sequence
<220> FEATURE:
<223> OTHER INFORMATION: Derivative peptide

<400> SEQUENCE: 25

Arg Ala Ile Glu Leu Leu Glu Lys Leu Gln Glu Ser Gly Asp Val Pro
1               5                   10                  15

Val His Lys Leu Gln Ser Leu Lys Lys Val Leu
                20                  25

<210> SEQ ID NO 26
<211> LENGTH: 27
<212> TYPE: PRT
<213> ORGANISM: Artificial Sequence
<220> FEATURE:
<223> OTHER INFORMATION: Derivative peptide

<400> SEQUENCE: 26

Ala Val Glu Asp Pro Met Glu Ile Leu Ile Thr Val Thr Tyr Gln Asn
1               5                   10                  15

Asp Asn Lys Pro Glu Phe Thr Gln Glu Val Phe
                20                  25

<210> SEQ ID NO 27
<211> LENGTH: 27
<212> TYPE: PRT
<213> ORGANISM: Artificial Sequence
<220> FEATURE:
<223> OTHER INFORMATION: Derivative peptide

<400> SEQUENCE: 27

Ala Ala Leu Ser Arg His Met Ser Ser Leu Ser His Ile Ser Ala Leu
1               5                   10                  15

Gln Pro Leu Gln Pro His Ala Asp His Ala His
                20                  25

<210> SEQ ID NO 28
<211> LENGTH: 27
<212> TYPE: PRT
<213> ORGANISM: Artificial Sequence
<220> FEATURE:
<223> OTHER INFORMATION: Derivative peptide

<400> SEQUENCE: 28

His Trp Gln Gln Gln Ser Tyr Leu Asp Ser Gly Ile His Phe Gly Ala
1               5                   10                  15

Thr Thr Thr Ala Pro Ser Leu Ser Gly Lys Gly
                20                  25

<210> SEQ ID NO 29
<211> LENGTH: 27
<212> TYPE: PRT
<213> ORGANISM: Artificial Sequence
<220> FEATURE:
<223> OTHER INFORMATION: Derivative peptide

<400> SEQUENCE: 29

Thr Ile Ile Thr Leu Glu Asp Ser Ser Gly Asn Leu Leu Val Arg Asn
1               5                   10                  15

Ser Phe Glu Val Arg Val Cys Ala Cys Pro Gly
                20                  25

<210> SEQ ID NO 30
<211> LENGTH: 27
<212> TYPE: PRT
<213> ORGANISM: Artificial Sequence
<220> FEATURE:
<223> OTHER INFORMATION: Derivative peptide

<400> SEQUENCE: 30

Met Thr Glu Tyr Lys Leu Val Val Val Gly Ala Gly Asp Val Gly Lys
1               5                   10                  15

```
Ser Ala Leu Thr Ile Gln Leu Ile Gln Asn His
         20                  25
```

TUMOR IMMUNOTHERAPY POLYPEPTIDE AND APPLICATION THEREOF

FIELD

The present disclosure relates to the field of biomedicine, and particularly, to tumor immunotherapy polypeptides and uses thereof. In particular, the present disclosure relates to an isolated polypeptide group, an isolated nucleic acid, a construct, an expression vector, a host cell, a pharmaceutical composition, an antigen-presenting cell, an immune effector cell, a tumor vaccine, use of the polypeptide in the preparation of drugs for preventing or treating tumors, and a method for treating a patient suffering from tumors.

BACKGROUND

Cancer, as a disease of uncontrolled cell proliferation caused by gene mutations in cells, has become a major threat to human health and is a major cause of human death. According to the "Analysis of the Epidemiology of Malignant Tumors in China in 2015" issued by the National Cancer Center, there were about 3.929 million malignant tumor incidences and 2.338 million malignant tumor deaths in China in 2015. The burden of cancer continues to rise. In the past 10 years, the incidence of malignant tumors has maintained an annual increase of about 3.9%, and the mortality rate has maintained an annual increase of 2.5%. Among them, the main high-incidence malignant tumors are lung cancer, gastric cancer, colorectal cancer, liver cancer, breast cancer and esophageal cancer. Therefore, it is of great clinical value to find efficient and specific cancer treatment methods.

Immunotherapy, by modulating the body's immune system, enhances the anti-tumor immunity of tumor microenvironment, so as to achieve the purpose of controlling and killing tumor cells. The immunotherapy has the advantages of high efficiency, high specificity, and good tolerance, and thus it has broad application prospect in tumor treatment. The immunotherapy mainly includes cytokine therapy, immune checkpoint monoclonal antibodies, adoptive cell reinfusion, and tumor immunotherapy vaccines, etc. Among them, the tumor immunotherapy vaccines mainly include tumor cell vaccines, dendritic cell vaccines, protein & polypeptide vaccines, nucleic acid vaccines, genetic engineering vaccines and anti-idiotype antibody vaccines. The main mechanism of these vaccines killing tumors is causing patients' immune response against tumors, thereby allowing T cells to recognize tumor cells and kill tumor cells.

Tumor antigens targeted by the tumor immunotherapy vaccines include tumor-associated antigens and tumor neoantigens. The tumor-associated antigens are derived from proteins that are highly expressed in tumor tissues but are low-expressed or not expressed in normal tissues. The tumor neoantigens are derived from mutant proteins produced by mutations in the tumor genome. As the tumor neoantigens only exist in tumor cells and do not exist in normal cells, the neoantigens can bypass the central immunotolerance and cause a strong T cell immune response, which has the characteristics of good effect. Meanwhile, the tumor neoantigens, due to the characteristics of tumor specificity, have the advantages of good safety and insignificant side effects. However, it is still necessary to further improve the tumor neoantigens targeted by suitable tumor immunotherapy vaccines.

SUMMARY

The present disclosure provides aims to solve one of the technical problems in the related art at least to a certain extent. To this end, an object of the present disclosure is to provide a tumor immunotherapy polypeptide and uses thereof, specifically related to an isolated polypeptide group, an isolated nucleic acid, a construct, an expression vector, a host cell, a pharmaceutical composition, an antigen-presenting cell, an immune effector cell, a tumor vaccine, use of the polypeptide in the preparation of drugs for preventing or treating tumors, and a method for treating a patient suffering from tumors.

Several schemes are usually adopted to perform a tumor immunotherapy on patients. Scheme 1: treating the patient by using tumor-associated antigens that are highly expressed in the patient's tumor. Such a treatment method may have poor effects, as the tumor-associated antigens may also be expressed in some normal tissues and thus these tumor-associated antigens may have low immunogenicity to tumor cells. Scheme 2: treating the patient by using tumor-associated antigens or tumor neoantigens that have been experimentally identified in some patients. However, tumor mutations are patient-specific, and most of the tumor mutations will not be repeated in multiple patients. Therefore, if the tumor-specific antigens identified in some patients have not been verified for their frequency of occurrence in a large number of tumor patients, the probability of re-use in new patients is low, and thus the number of patients who can be treated with these tumor neoantigens is small. Scheme 3: performing individualized tumor neoantigen screening for each patient. For example, the tumor-specific mutations of the patient and the variant peptide segments that may be generated by these mutations can be obtained by analyzing the sequencing data of the patient's genome and transcriptome, then the machine learning algorithm can be employed to predict which variant peptide segments may be presented by MHC molecules to become antigens, and then these predicted tumor neoantigens are used for patient treatment. Regarding the individualized tumor neoantigen screening scheme based on sequencing, although genome and transcriptome of a certain patient can be sequenced and the tumor neoantigens for treating the specific patient can be screened out through the sequencing data analysis and antigen algorithm prediction, the whole process is costly and time-consuming, the screened antigens have a high false positive rate due to the low accuracy of the existing antigen prediction algorithm, and some of the predicted antigens cannot effectively cause an immune response in the patient's body, thereby leading to a poor curative effect for the patient. Scheme 4: combining the above schemes, that is, using a group of identified tumor-associated antigens and tumor neoantigens, in combination with the individualized tumor neoantigen screening program. For example, the antigens known in Scheme 1 or Scheme 2 are used to perform a first stage of treatment on the patient, and at the same time, the individualized antigen screening is performed on the patient with reference to Scheme 3, and then the antigens obtained from the screening are used to perform a second stage of treatment on the patient. Although such a scheme can solve the long-time consuming problem of individualized tumor neoantigen screening, the treatment cost still cannot be lowered due to the involvement of the scheme of individualized tumor neoantigen screening.

Through a large amount of data analysis and experimental screening, the present disclosure has discovered the high-frequency mutant genes that repeatedly appear in a variety of cancers, and the mutant polypeptides encoded by these high-frequency mutant genes can be specifically and highly expressed in tumor tissues. The high affinity of these mutant polypeptides to HLA molecules and their presentation in tumor cells have been verified through experiments. Furthermore, the present disclosure modifies a sequence of one important core polypeptide, and has screened out, through a large number of experiments, variant polypeptides that can be recognized by the same T cells like the original mutant polypeptide but have a better ability of activating T cells and inducing antigen-specific T cells to kill tumors. The provided polypeptides can repeatedly appear in tumors of patients with various cancers, have high coverage, and have good tumor killing effects and high safety.

Specifically, the present disclosure provides the following technical solutions.

In a first aspect of the present disclosure, the present disclosure provides an isolated polypeptide group. The isolated polypeptide group includes at least one polypeptide in a first peptide group, and optionally, at least one polypeptide in a second peptide group. The first peptide group includes polypeptides having amino acid sequences set forth in SEQ ID NO: 1 to SEQ ID NO: 6, and first derivative peptides thereof. The first derivative peptides each include a first front peptide segment, a first middle peptide segment, and a first back peptide segment that are connected in sequence. The first middle peptide segment has at least 80% homology with the amino acid sequences set forth in SEQ ID NO: 1 to SEQ ID NO: 6, and a sum of lengths of the first front peptide segment and the first back peptide segment ranges from 5 amino acids to 20 amino acids. The second peptide group includes polypeptides having amino acid sequences set forth in SEQ ID NO: 7 to SEQ ID NO: 15, and second derivative peptides thereof. The second derivative peptides each include a second front peptide segment, a second middle peptide segment, and a second back peptide segment that are connected in sequence. The second middle peptide segment has at least 80% homology with the amino acid sequences set forth in SEQ ID NO: 7 to SEQ ID NO: 15, and a sum of lengths of the second front peptide segment and the second back peptide segment ranges from 5 amino acids to 20 amino acids.

The above isolated polypeptides, as tumor neoantigen polypeptide sequences, include tumor-specific antigens produced by the tumor gene mutation and variants thereof, and they will not be expressed and presented in the normal tissues, thereby solving the problem of low safety when using tumor-associated antigens. Moreover, the provided polypeptide sequences are derived from antigens produced by the high-frequency mutant genes in various cancers and variants thereof, and can be presented by HLA molecules that frequently appear in the population, such that they can repeatedly appear in the tumors of patients with various cancers, thereby overcoming the problem that the common tumor neoantigen therapy covers a small number of patients. These polypeptide sequences have the characteristics of affinity with HLA molecules, the ability of stimulating T cells to proliferate and secrete cytokines, and the ability of inducing antigen-specific T cells to kill target cells, and have good tumor control effects. Using these polypeptides to treat patients, since the de novo antigen prediction and screening are not required to be performed on the patients, the waiting time of patients before treatment is shortened, compared with the individualized tumor neoantigen screening scheme based on sequencing.

According to the embodiments of the present disclosure, the isolated polypeptides as described above may further have the following technical features.

In some embodiments of the present disclosure, the first derivative peptides include polypeptides having amino acid sequences set forth in SEQ ID NO: 16 to SEQ ID NO: 21, and the second derivative peptides include polypeptides having amino acid sequences set forth in SEQ ID NO: 22 to SEQ ID NO: 30.

In some embodiments of the present disclosure, a polypeptide of the isolated polypeptide group is selected from at least one group of:
  group 1: at least two polypeptides having amino acid sequences set forth in SEQ ID NO: 1 to SEQ ID NO: 6;
  group 2: at least one polypeptide having an amino acid sequence set forth in SEQ ID NO: 1 to SEQ ID NO: 6, and at least one polypeptide having an amino acid sequence set forth in SEQ ID NO: 7 to SEQ ID NO: 15;
  group 3: at least two polypeptides having amino acid sequences set forth in SEQ ID NO: 16 to SEQ ID NO: 21;
  group 4: at least one polypeptide having an amino acid sequence set forth in SEQ ID NO: 16 to SEQ ID NO: 21, and at least one polypeptide having an amino acid sequence set forth in SEQ ID NO: 7 to SEQ ID NO: 15;
  group 5: at least one polypeptide having an amino acid sequence set forth in SEQ ID NO: 1 to SEQ ID NO: 6, and at least one polypeptide having an amino acid sequence set forth in SEQ ID NO: 22 to SEQ ID NO: 30; or
  group 6: at least one polypeptide having an amino acid sequence set forth in SEQ ID NO: 16 to SEQ ID NO: 21, and at least one polypeptide having an amino acid sequence set forth in SEQ ID NO: 22 to SEQ ID NO: 30.

The polypeptides in any above-mentioned polypeptide sequence group are derived from tumor-specific antigens produced by the tumor gene mutation, and they are not expressed and presented in normal tissues, and thus have higher safety in the treatment. At the same time, they have the characteristics of affinity with HLA molecules, the ability of stimulating T cells to proliferate and secrete cytokines, and the ability of inducing antigen-specific T cells to kill target cells, and have better tumor control effects.

In a second aspect of the present disclosure, the present disclosure provides an isolated nucleic acid or a complementary sequence thereof. According to the embodiments of the present disclosure, the nucleic acid encodes a polypeptide selected from the isolated polypeptide group as described above. As described above, the above-mentioned polypeptides, as antigens, can be presented onto the surface of tumor cells by HLA molecules having affinity with these polypeptides, and these polypeptides have the ability of activating T cells and directing these T cells to kill tumors. Thus, the nucleic acid sequences capable of encoding the above-mentioned polypeptides, or the sequences complementary to these nucleic acid sequences capable of encoding the above-mentioned polypeptides can be used to prevent or treat tumors.

In a third aspect of the present disclosure, the present disclosure provides a construct. According to the embodiments of the present disclosure, the construct includes the nucleic acid according to the second aspect of the present disclosure, and a control sequence. The control sequence is operably linked to the nucleic acid. The construct provided by the embodiments of the present disclosure can efficiently express the above-mentioned polypeptide in suitable host cells under suitable conditions, and thus can be effectively used for the treatment or prevention of tumors. The control sequence can direct the nucleic acid to express the above-mentioned polypeptide in the hosts, and one or more control sequences may be included. These control sequences may be promoters, terminators, SD sequences, regulatory genes for regulating the expression of genes, and the like, as required.

In a fourth aspect of the present disclosure, the present disclosure provides an expression vector. According to the embodiments of the present disclosure, the expression vector includes the construct according to the third aspect of the present disclosure. The expression vector provided by the present disclosure can efficiently express the above-mentioned polypeptide in host cells under suitable conditions, and can be effectively used for the treatment or prevention of tumors.

In a fifth aspect of the present disclosure, the present disclosure provides a host cell. According to the embodiments of the present disclosure, the host cell carries the construct according to the third aspect of the present disclosure or the expression vector according to the fourth aspect of the present disclosure. The host cell can be obtained through a transfection or transformation of the aforementioned nucleic acid construct or expression vector. The host cell can efficiently express the above-mentioned polypeptide under suitable conditions, and can be effectively used for the treatment or prevention of tumors.

In a sixth aspect of the present disclosure, the present disclosure provides use of a polypeptide selected from the isolated polypeptide group according to the first aspect of the present disclosure in the preparation of drugs for preventing or treating tumors or in the preparation of kits for diagnosing tumors. The tumors include, but are not limited to, breast cancer, lung cancer, skin cancer, gastric cancer, colorectal cancer, esophageal cancer, renal cancer, liver cancer and pancreatic cancer, and these tumors all express any genes corresponding to the above-mentioned polypeptides, as well as HLA molecules having affinity with these polypeptides. According to the embodiments of the present disclosure, the above-mentioned polypeptides, as antigens, can be presented onto the surface of tumor cells by HLA molecules having affinity with these polypeptides, and these polypeptides have the ability of activating T cells and directing these T cells to kill tumors. Therefore, the polypeptides provided by the embodiments of the present disclosure can be used for the prevention and control of tumors or for the preparation of kits capable of diagnosing tumors. Meanwhile, as mentioned above, since the polypeptides provided by the present disclosure are specifically expressed in tumor cells, they have better safety in the treatment or prevention of tumors.

In a seventh aspect of the present disclosure, the present disclosure provides a pharmaceutical composition. According to the embodiments of the present disclosure, the pharmaceutical composition includes a polypeptide selected from the isolated polypeptide group and a pharmaceutically acceptable excipient. The pharmaceutical composition including the above-mentioned polypeptide and the excipient can significantly stimulate the proliferation of tumor-specific T cells and the cytokine secretion of these T cells so as to kill the tumor cells expressing the corresponding mutant genes, and thus can be used in the treatment or prevention of tumors. The above pharmaceutical composition may also include some pharmaceutically acceptable adjuvants. These adjuvants, as non-specific immune enhancers, can enhance the body's immune response to polypeptide antigens or change the type of immune response, when they are injected together with the aforementioned polypeptide or pre-injected into the body. The suitable adjuvants include, but are not limited to, PD1 inhibitors.

In an eight aspect of the present disclosure, the present disclosure provides an antigen-presenting cell. According to the embodiments of the present disclosure, the antigen-presenting cell is capable of presenting a polypeptide selected from the isolated polypeptide group as described in any embodiment according to the first aspect of the present disclosure. The antigen-presenting cell can be obtained by loading the polypeptide, transfecting or transforming the aforementioned construct or expression vector, or phagocytosing the aforementioned host cell. According to the embodiments of the present disclosure, the antigen-presenting cells presenting the aforementioned polypeptide significantly stimulate the proliferation of tumor-specific T cells and the cytokine secretion of these T cells, thereby killing tumor cells expressing the genes corresponding to the polypeptide, and thus the antigen-presenting cells can be used for the treatment or prevention of tumors. These usable antigen-presenting cells can be dendritic cells, macrophages, B cells, and the like.

In a ninth aspect of the present disclosure, the present disclosure provides an immune effector cell. According to the embodiments of the present disclosure, the immune effector cell is capable of recognizing a polypeptide selected from the isolated polypeptide group according to the first aspect of the present disclosure or the antigen-presenting cell according to the eighth aspect of the present disclosure. The immune effector cells can be obtained through inducing of the polypeptides as described in the first aspect of the present disclosure or the antigen-presenting cells as described in the eighth aspect of the present disclosure. The immune effector cells can specifically kill tumor cells expressing the corresponding mutant genes, and thus can be used for the treatment or prevention of tumors. The usable immune effector cells can be T cells, effector T cells, NK cells and the like.

In a tenth aspect of the present disclosure, the present disclosure provides a tumor vaccine. According to the embodiments of the present disclosure, the tumor vaccine includes the nucleic acid as described above, or the construct as described above, or the expression vector as described above, or the host cell as described above, or the antigen-presenting cell as described above, or the immune effector cell as described above.

In an eleventh aspect of the present disclosure, the present disclosure provides a method for treating a patient suffering from tumors. The method includes: administering an effective amount of the pharmaceutical composition as described in the seventh aspect or an effective amount of the tumor vaccine as described in the tenth aspect to the patient. The "effective amount" of the pharmaceutical composition refers to an amount that can achieve the purpose of inhibiting tumor growth or intervening tumor proliferation. The "effective amount" of the tumor vaccine refers to an amount of the tumor vaccine which, once introduced to patient's body, can overcome the immunosuppressive state caused by tumors and activate the patient's own immune system, thereby controlling or eliminating the tumors.

DESCRIPTION OF EMBODIMENTS

Figure 1:
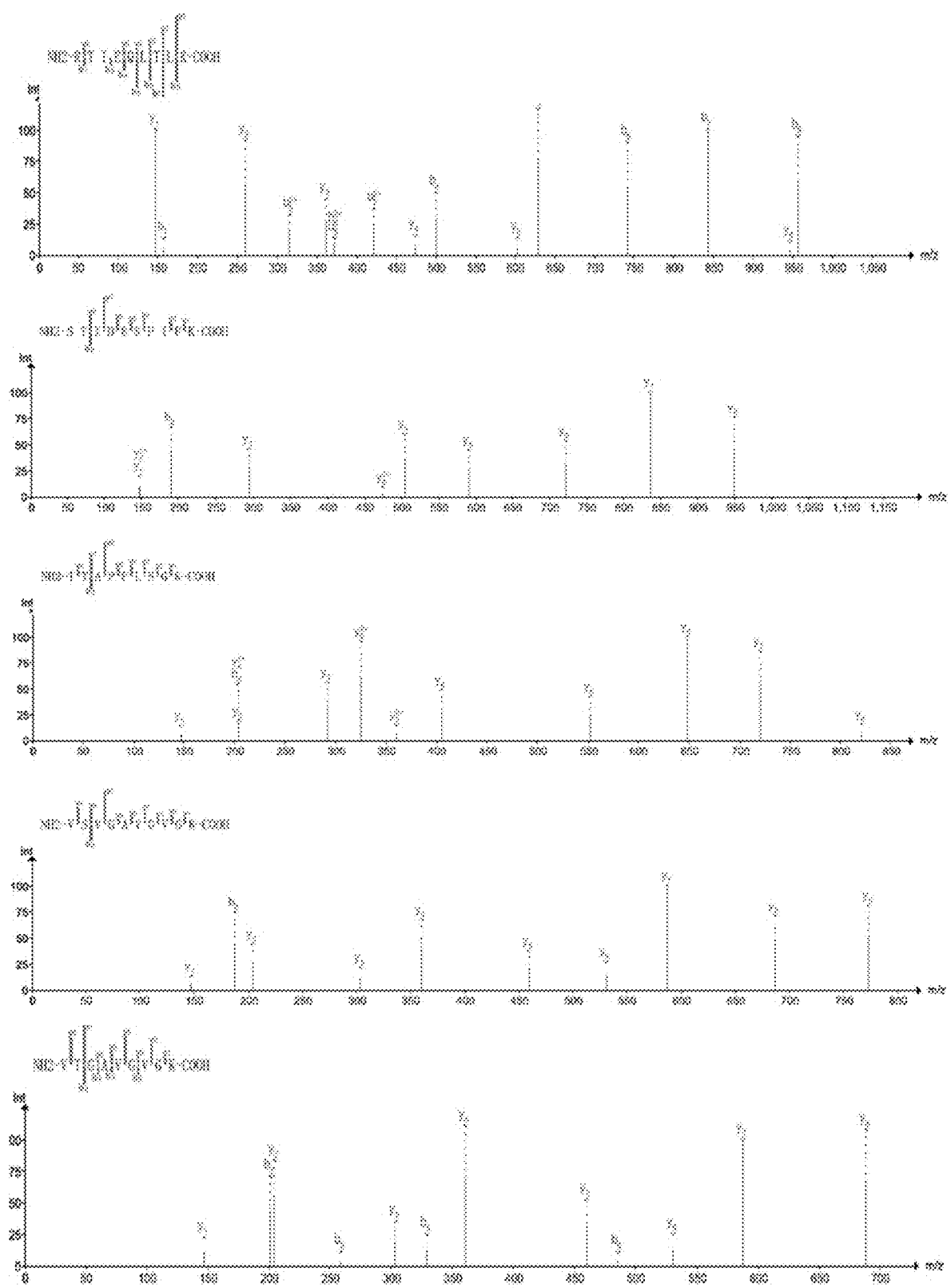
FIG. 1 illustrates result diagrams of mass spectrometry identification of some polypeptides as set forth in SEQ ID NOs: 8, 7, 9, 6, and 3 according to embodiments of the present disclosure.

The embodiments of the present disclosure will be described in detail below with reference to the accompanying drawings. It should be noted that these embodiments are exemplary and are intended to be used to explain the present disclosure, rather than being construed as limitations on the present disclosure.

Meanwhile, some terms of the present disclosure are explained and described in order to facilitate the understanding of those skilled in the art. It should be noted that these explanations and descriptions are only used to help the understanding of the technical solutions of the present disclosure, and should not be considered as limitations on the scope of protection of the present disclosure.

The terms "first" and "second" are only used for descriptive and distinguishing purposes, but cannot be understood as indicating or implying relative importance or implying the number of indicated technical features. In the description of the present disclosure, "plurality of" means at least two, such as two, three, etc., unless expressly and specifically defined otherwise. Herein, unless otherwise specified, when referring to the connection between amino acids or polypeptides, the connection is an amide bond formed by dehydration of a carboxyl group in one amino acid molecule and an amino group in another amino acid molecule.

The term "first peptide group" or "second peptide group" refers to polypeptides including different amino acid sequences.

The term "first derivative peptides" is used to represent polypeptide sequences derived from polypeptides having amino acid sequences set forth in SEQ ID NO: 1 to SEQ ID NO: 6. The sequence of each of these derivative peptides includes, from the N-terminus to the C-terminus, a first front peptide segment, a first middle peptide segment, and a first back peptide segment that are connected in sequence. The first middle peptide segment has at least 80%, preferably at least 90% homology with any of the amino acid sequences set forth in SEQ ID NO: 1 to SEQ ID NO: 6. A sum of lengths of the first front peptide segment and the first back peptide segment is 5 to 20 amino acids. Preferably, the sum of the lengths of the first front peptide segment and the first back peptide segment is 15 to 18 amino acids. The specific types of amino acids of the first front peptide segment and the first back peptide segment may not be particularly limited. In at least some embodiments, these first derivative peptides may be long peptide sequences obtained by extending the amino acid sequences set forth in SEQ ID NO: 1 to SEQ ID NO: 6 from both ends of the amino acid sequences and having a total length of 15 mer to 28 mer, preferably long peptide sequences obtained by extending the amino acid sequences set forth in SEQ ID NO: 1 to SEQ ID NO: 6 from both ends of the amino acid sequences and having a total length of 25 mer to 27 mer. In some preferred embodiments, these first derivative peptides may be polypeptides having the amino acid sequences set forth in SEQ ID NO: 16 to SEQ ID NO: 21.

The term "second derivative peptides" is used to represent polypeptide sequences derived from polypeptides having amino acid sequences set forth in SEQ ID NO: 7 to SEQ ID NO: 15. The sequence of each of these derivative peptides includes, from the N-terminus to the C-terminus, a second front peptide segment, a second middle peptide segment, and a second back peptide segment that are connected in sequence. The second middle peptide segment has at least 80%, preferably at least 90% homology with any of the amino acid sequences set forth in SEQ ID NO: 7 to SEQ ID NO: 15. A sum of lengths of the second front peptide segment and the second back peptide segment is 5 to 20 amino acids. The specific types of amino acids of the second front peptide segment and the second back peptide segment may not be particularly limited. In at least some embodiments, these second derivative peptides may be long peptide sequences obtained by extending the amino acid sequences set forth in SEQ ID NO: 7 to SEQ ID NO: 15 from both ends of the amino acid sequences and having a total length of 15 mer to 28 mer. In some preferred embodiments, these second derivative peptides may be polypeptides having the amino acid sequences set forth in SEQ ID NO: 22 to SEQ ID NO: 30.

In at least some embodiments of the present disclosure, the isolated polypeptides provided by the present disclosure are selected from at least one group of:
  group 1: polypeptides having amino acid sequences set forth in SEQ ID NO: 1 to SEQ ID NO: 6;
  group 2: at least one polypeptide having an amino acid sequence set forth in SEQ ID NO: 1 to SEQ ID NO: 6, and at least one polypeptide having an amino acid sequence set forth in SEQ ID NO: 7 to SEQ ID NO: 15;
  group 3: polypeptides having amino acid sequences set forth in SEQ ID NO: 16 to SEQ ID NO: 21;
  group 4: at least one polypeptide having an amino acid sequence set forth in SEQ ID NO: 16 to SEQ ID NO: 21, and at least one polypeptide having an amino acid sequence set forth in SEQ ID NO: 7 to SEQ ID NO: 15;
  group 5: at least one polypeptide having an amino acid sequence set forth in SEQ ID NO: 1 to SEQ ID NO: 6, and at least one polypeptide having an amino acid sequence set forth in SEQ ID NO: 22 to SEQ ID NO: 30; or
  group 6: at least one polypeptide having an amino acid sequence set forth in SEQ ID NO: 16 to SEQ ID NO: 21, and at least one polypeptide having an amino acid sequence set forth in SEQ ID NO: 22 to SEQ ID NO: 30.

The polypeptides having the amino acid sequences set forth in SEQ ID NO: 1 to SEQ ID NO: 30 are shown in Table 1 and Table 2 below.

TABLE 1

First peptide group

| SEQ ID | Sequences of polypeptides | Genes | SEQ ID | Sequences of derivative peptides |
|---|---|---|---|---|
| NO: 1 | VTVGADGVGK | KRAS | NO: 16 | MTEYKLVTVGADGVGKSALTIQLIQN |
| NO: 2 | VTVGARGVGK | KRAS | NO: 17 | MTEYKLVTVGARGVGKSALTIQLIQN |
| NO: 3 | VTGAVGVGK | KRAS | NO: 18 | MTEYKLVTVGAVGVGKSALTIQLIQN |
| NO: 4 | VTVGAVGVGK | KRAS | NO: 19 | MTEYKLVTVGAVGVGKSALTIQLIQN |
| NO: 5 | VTVGAAGVGK | KRAS | NO: 20 | MTEYKLVTVGAAGVGKSALTIQLIQN |
| NO: 6 | VSVGAVGVGK | KRAS | NO: 21 | MTEYKLVSVGAVGVGKSALTIQLIQN |

TABLE 2

Second peptide group

| SEQ ID | Sequences of polypeptides | Genes | SEQ ID | Sequences of derivative peptides |
|---|---|---|---|---|
| NO: 7 | STIDESPIFK | GLCE | NO: 22 | NQLQLLSTIDESPIFKEFVKRWKSYLK |
| NO: 8 | RTIEQLTLK | ARHGEF11 | NO: 23 | PPSLALRDVGMIFRTIEQLTLKLNRLK |
| NO: 9 | TTAPFLSGK | CTNNB1 | NO: 24 | DSGIHSGATTTAPFLSGKGNPEEEDVD |
| NO: 10 | KLQESGDVPV | LIN7A | NO: 25 | RAIELLEKLQESGDVPVHKLQSLKKVL |
| NO: 11 | TYQNDNKPEF | CDH1 | NO: 26 | AVEDPMEILITVTYQNDNKPEFTQEVF |
| NO: 12 | ALQPLQPHA | GATA3 | NO: 27 | AALSRHMSSLSHISALQPLQPHADHAH |
| NO: 13 | SYLDSGIHF | CTNNB1 | NO: 28 | HWQQQSYLDSGIHFGATTTAPSLSGKG |
| NO: 14 | TLEDSSGNLLV | TP53 | NO: 29 | TIITLEDSSGNLLVRNSFEVRVCACPG |
| NO: 15 | VVVGAGDVGK | KRAS | NO: 30 | MTEYKLVVVGAGDVGKSALTIQLIQNH |

It is confirmed that these polypeptides can be applied in tumor immunotherapy, for example, they can be used for the prevention and treatment of 9 common solid tumors including breast cancer, lung cancer, skin cancer, gastric cancer, colorectal cancer, esophageal cancer, renal cancer, liver cancer and pancreatic cancer. The proposed polypeptide sequences are derived from tumor-specific antigens produced by tumor gene mutations and are not expressed and presented in normal tissues, and thus they are safe for the treatment. The provided polypeptide sequences are obtained by modifying the original antigen sequences and performing a large number of screening experiments. Compared with the original tumor antigens, they have the affinity with HLA molecules, the ability of stimulating T cells to proliferate and secrete cytokines, and the strong ability of inducing antigen-specific T cells to kill target cells, thereby having better tumor control effect.

The schemes of the present disclosure will be explained below in conjunction with the embodiments. Those skilled in the art will understand that the following examples are only used to illustrate the present disclosure and should not be regarded as limiting the scope of the present disclosure. Techniques or conditions, when not specified in the embodiments, shall be those described in the literatures in the related art or shall be in accordance with the product specification. Reagents or instruments, without indicating the manufacturers thereof, shall be conventional and commercially available products.

Example 1

Based on a large amount of tumor mutation data from public database such as TCGA/ICGC, high-frequency mutations were statistically analyzed, the high-frequency typing of the Chinese population was predicted, screened, and experimentally verified to obtain core polypeptide sequences and high-frequency mutant polypeptide sequences. The obtained core polypeptide sequences are immunogenic neoantigens generated by mutations on the KRAS gene, and are set forth in SEQ ID NO: 1 to SEQ ID NO: 6. The obtained high-frequency mutant polypeptides are immunogenic neoantigens generated by high-frequency mutations among the Chinese population, and are set forth in SEQ ID NO: 7 to SEQ ID NO: 15. In addition, using the obtained core polypeptide sequences and the obtained high-frequency mutant polypeptide sequences, in combination with the high-frequency typing data of the population, the corresponding derivative peptides are obtained through screening and verification, and these derivative peptides are polypeptide sequences formed by extending these polypeptide sequences from both ends to a length of 25 to 27 amino acids. These derivative peptide sequences are set forth in SEQ ID NO: 16 to SEQ ID NO: 30, respectively.

Example 2 Verification of Presentation of Polypeptides by HLA Molecules on Surface of Tumor Cells Through Mass Spectrometry Experiments The genes encoding the polypeptide sequences provided in Example 1 were transfected into the tumor cell line by lentiviral transfection, and then the polypeptide-MHC complexes on the cell surfaces were enriched through the combination of co-immunoprecipitation and mass spectrometry. Then, verification was performed on whether MHC molecules on the surface of tumor cells present the mutant polypeptides. The specific method is described as below.

1. Separation and purification of MHC-I-restricted T cell epitope peptides: pan-MHC-I A/B/C antibody (clone number: w6/32) were bonded to sepharose CL-4B beads coupled with protein A molecules on the surfaces at 4° C. for 1 hour, and NanoDrop was used to detect the residual antibody content in the supernatant. An antibody binding rate greater than 90% was regarded to be qualified, and pan-MHC-I A/B/C-binding sepharose was prepared and stored at 4° C. for use. 40 ml of RIPA lysate was added to the cell samples, incubated at 4° C. for 1 hour, and centrifuged at 12,000 rpm for 30 min. Then, the sepharose CL-4B beads were added to the supernatant for pre-hybridization, and incubated at 4° C. for 1 hour; the beads were removed by centrifugation, and the pan-MHC-A/B/C-binding sepharose CL-4B beads were added to the supernatant and incubated at 4° C. overnight (16 to 18 hours). The beads were washed three times with PBS pre-cooled at 4° C.; then the beads were washed with ultrapure water; and the washing solution was removed by centrifugation. 0.1N acetic acid was used to elute the antibody-MHC-I protein complexes on the surfaces of the beads, and the antibody-MHC-I protein complexes were dissociated under acidic conditions. Further, proteins and polypeptides in the eluted product were separated and purified using a 3 kDa ultrafiltration tube or c18 solid phase extraction column (25 mg, waters), the purified product was concentrated using a refrigerated vacuum centrifuge, and the concentrated product was stored at −20° C. before being loaded on a mass spectrometer.

2. Mass spectrometry identification of MHC-I-restricted T cell epitope peptides: a concentrated solution of MHC-I-restricted epitope peptides was analyzed through a Q Exactive mass spectrometer (Thermo Fisher Scientific) online connected to nanoflow HPLC (Thermo Fisher Scientific). A separation column, which was manually filled with Repro-Sil-Pur C18-AQ 1.9 um for a length of 15 cm and had an inner diameter of 75 um, was used for separation. Buffer B (80% ACN/0.5% acetic acid) of linear gradients from 2% to 30% was used to elute the peptides, with a flow rate of 250 nl/min and an elution time of 90 min. Fragmentation of the secondary mass spectrometry was performed by HCD, and the data-dependent "Top 20" method was selected for data acquisition. The acquisition resolution of the MS spectrum was 70,000, 200 m/z, with a target value of 3E6 ions. The ions having the top 10 ion intensities were usually separated and accumulated with a maximum injection time of 120 ms until the displayed value of the automatic gain controller was 1E5. Polypeptide matching option was set to be "disable", MS/MS resolution was set to be 17,500 (200 m/z).

3. Mass spectrometry data analysis of MHC-I-restricted T cell epitope peptides: data analysis was performed using MaxQuant (version 1.3.10.15) to compare mass spectrograms and human whole protein library (Uniprot, 86,749 proteins), tumor-associated antigens, tumor-specific mutant peptide segments, and a list of spectrograms generated from a data set of 247 common contaminants (keratin, bovine serum albumin, and proteases). Variable modification detection setting: N-terminus acetylation and methionine oxidation. The second polypeptide identification setting: enable; the specific restriction setting: unspecific; the polypeptide identification FDR (false discovery rate) setting: 1%, without setting protein identification FDR; the sequence matching length limit setting: 8 to 15 aa; the maximum polypeptide mass setting: 1500 Da, and the maximum charge state setting: 3. The initial allowable mass deviation of leading ions was set to 6 ppm, and the maximum fragment mass deviation was set to 20 ppm. The "match between runs" was set to initiate. The identification result output was saved in the "peptide.txt" file, and the polypeptides matched to the reverse library and the contamination library were removed, and the rest were the identification results of MHC-I restricted epitopes.

Figure 2:
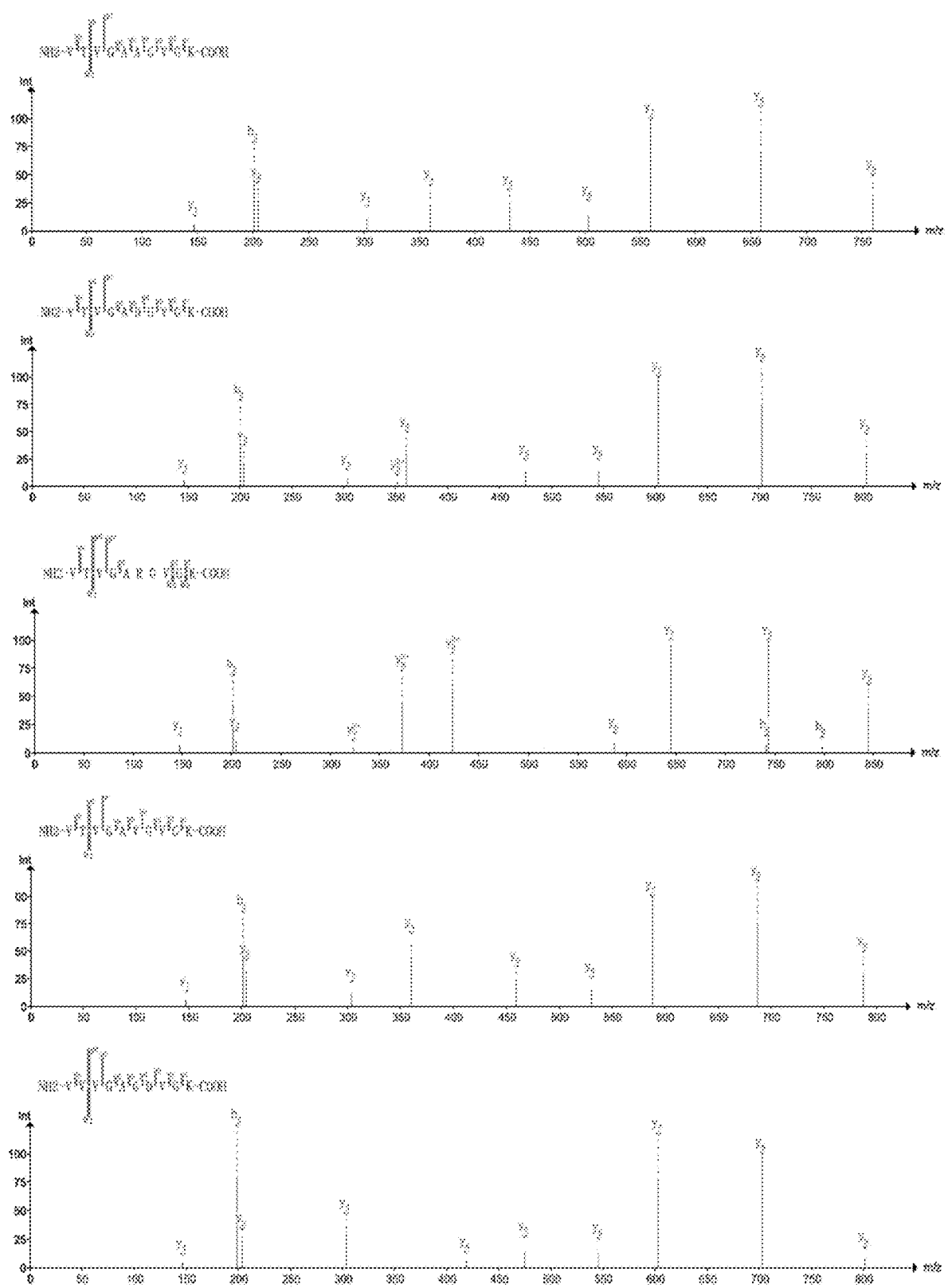
FIG. 2 illustrates result diagrams of mass spectrometry identification of some polypeptides as set forth in SEQ ID NOs: 5, 1, 2, 4, and 15 according to embodiments of the present disclosure.

It was confirmed that each polypeptide sequence provided in Example 1 can be expressed and presented on the HLA molecules on the cell surface. FIG. 1 and FIG. 2 show the mass spectra of some core polypeptide sequences and some high-frequency mutant polypeptide sequences. The sequences shown in FIG. 1 include SEQ ID NO: 8, SEQ ID NO: 7, SEQ ID NO: 9, SEQ ID NO: 6, and SEQ ID NO: 3; and the polypeptide sequences shown in FIG. 2 include SEQ ID NO: 5, SEQ ID NO: 1, SEQ ID NO: 2, SEQ ID NO: 4, and SEQ ID NO: 15.

Example 3 Verification of Affinity of Polypeptides with T2 Cells

T2 cells are a necessary antigen polypeptide transporter-deficient cell line in the endogenous antigen presentation pathway, and can be used to study the strength of the mutual recognition with MHC molecules in the antigen presentation process.

In order to verify the affinity of exogenous polypeptides with T2 cells, a polypeptide that had been confirmed to have strong affinity with T2 cells was used as a positive control, T2 cells without adding polypeptides were used as blank controls, and a polypeptide that was known having no affinity with T2 cells were used as a negative control. The binding of exogenous polypeptides to MHC-I molecules on the surfaces of T2 cells can increase the expression of MHC-I molecules on the surfaces of T2 cells, and the more stable the binding is, the more MHC-I molecules can be detected, and finally the average fluorescence intensity is used as a detection index, and the fluorescence index (FI) is used as a measurement index. Based on this, the affinity of the polypeptide with T2 cells was determined. The higher the FI value, the stronger the affinity of the polypeptide with T2 cells, which was conducive to the subsequent recognition of specific CD8$^+$ T cells.

The synthesized polypeptides were added to $2*10^5$ T2 cells, and human β2 micro-globulin (final concentration of 3 μg/ml) was added and cultivated in 24-well plate. The plate was cultured in an incubator (37° C., 5% $CO_2$) overnight. T2 cells without adding polypeptides were used as background controls, and a CMV polypeptide having a sequence of NLVPMVATV, which is a viral peptide and is also a known polypeptide with strong affinity with T2 cells, was used as a positive control, duplicate wells for each experiment, and the average value was calculated.

Figure 3:
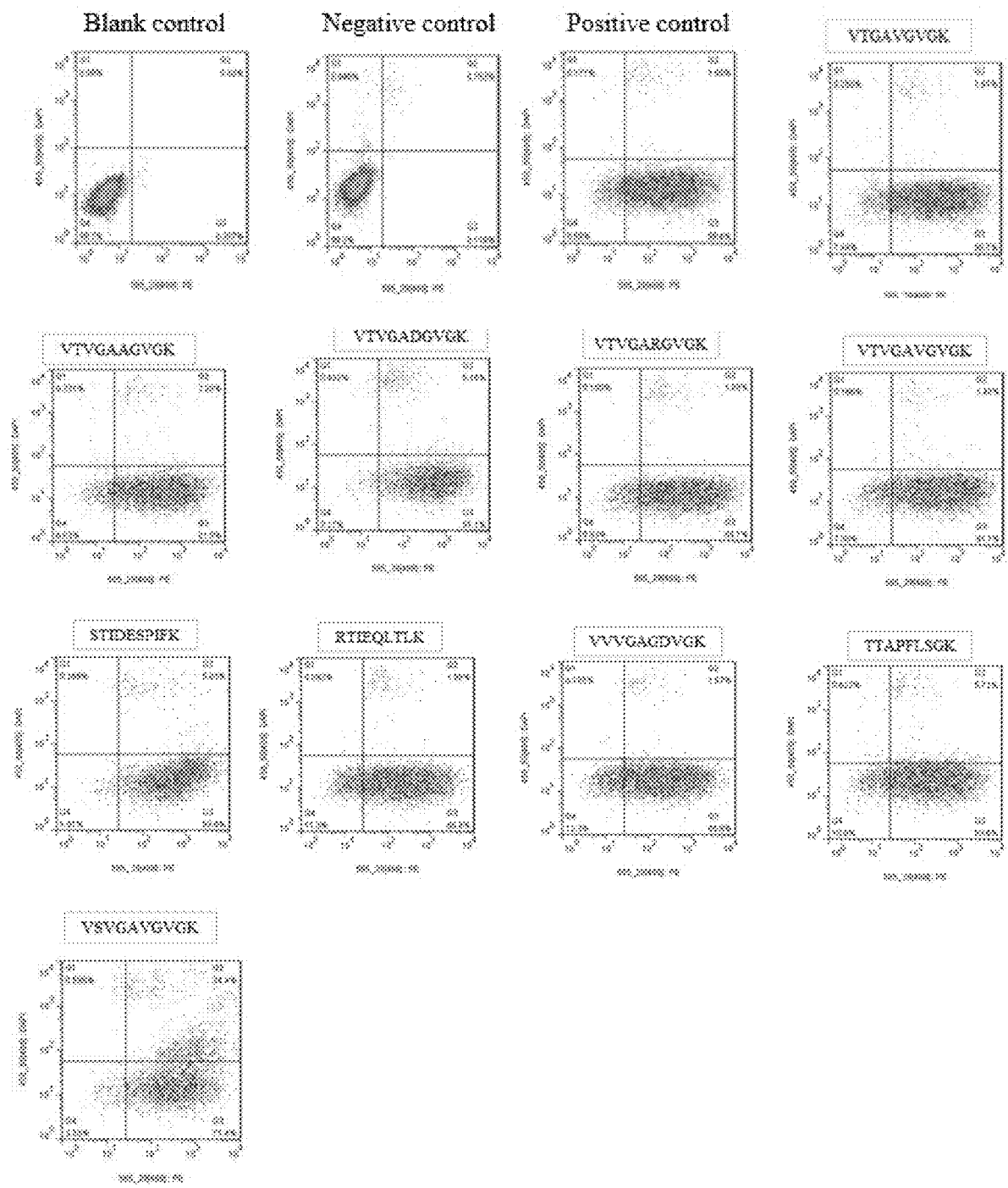
FIG. 3 illustrates result diagrams of flow cytometry verification of affinities of different polypeptides as set forth in SEQ ID NOs: 3, 5, 1, 2, 4, 7, 8, 15, 9, and 6 with T2 cells according to embodiment of the present disclosure.

200 g of cultured cells was centrifuged for 5 minutes to collect the cells. After washing twice with PBS, the cells were directly incubated with FITC-labeled monoclonal antibody against the corresponding HLA typing (HLA-A*11: 01), and maintained at 4° C. for 30 minutes. The mean fluorescence intensity was then detected and analyzed by a flow cytometer (BD FACSJazz™) and its software, see FIG. 3. The obtained T2 cell affinity results are shown in Table 3 below.

TABLE 3

T2 cell affinity results

| Sequences of polypeptides | FI | Conclusion |
|---|---|---|
| Positive control | 1.63 | |
| VTGAVGVGK | 2.37 | High affinity |
| VTVGAAGVGK | 2.12 | High affinity |
| VTVGADGVGK | 2.83 | High affinity |
| VTVGARGVGK | 1.63 | High affinity |
| VTVGAVGVGK | 2.02 | High affinity |
| VSVGAVGVGK | 2.42 | High affinity |
| STIDESPIFK | 4.09 | High affinity |
| RTIEQLTLK | 1.57 | High affinity |
| VVVGAGDVGK | 1.66 | High affinity |
| TTAPFLSGK | 1.02 | Medium affinity |

As can be seen from Table 3, compared with the positive control, the polypeptides provided in the present disclosure, except the TTAPFLSGK polypeptide, all showed high affinity, and the fluorescence index values were basically greater than 1.6.

Example 4 Proliferation of $CD^{8+}$ T Cells Stimulated by Polypeptides In Vitro The peripheral blood mononuclear cells (PBMCs) were collected from the volunteers who were positive for the corresponding subtype of the polypeptide. For $2 \times 10^7$ PBMCs, mononuclear cells were separated by using the adherent method (adhered for 3 h), and $CD^{8+}$ T cells were isolated by using CD8 magnetic beads. The adherent mononuclear cells were induced to immature DC cells by using GM-CSF (1000 U/ml) and IL-4 (1000 U/ml). Then, the immature DC cells were induced into polypeptide-specific mature DC cells by IFN-gamma (100 U/ml), LPS (10 ng/ml) and the respective polypeptides. The obtained polypeptide-specific mature DC cells were co-cultured with volunteers' $CD8^+$ T cells, and IL-21 was added. After 3 days, IL-2 and IL-7 were supplemented. Thereafter, IL-2 and IL-7 were supplemented on day 5 and day 7, and on day 10, the co-cultured cells were counted, and the subsequent ELISPOTs and LDH were detected.

Example 5 Verification of Activation of $CD8^+$ T Cell Immune Response by Polypeptides with ELISPOT Method The ELISPOT method is an enzyme-linked immunospot assay, which can detect the cytokines secreted by a single cell. In the assay, the culture plate was coated with specific monoclonal antibodies, and then the cells to be detected and antigenic stimulant were added for culture. Under the stimulation of the stimulant, the corresponding cytokines were secreted by the T cells, and the secreted cytokines were captured by the antibodies coated on the culture plate. After washing away the cells, the captured cytokines were bonded to fluorescently labeled secondary antibodies to form spots. That is, the cytokines secreted by the cells in the culture can be captured by the coated antibodies and thus presented in the form of colored enzyme-linked spots, so as to detect and verify the strength of the immune response of the $CD8^+$ T cells activated by the polypeptides.

Figure 4:
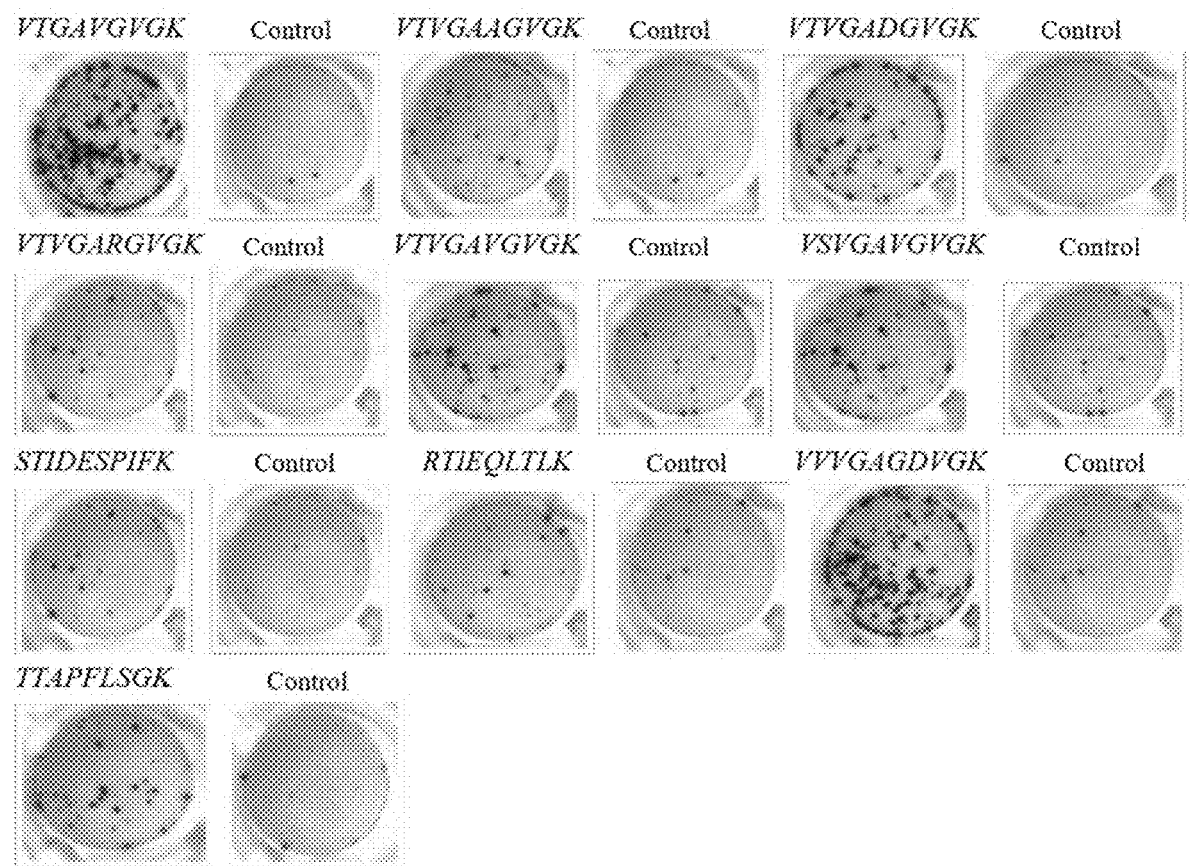
FIG. 4 illustrates result diagrams of verification of activation of CD$^{8+}$ T cell immune response by polypeptides as set forth in SEQ ID NOs: 3, 5, 1, 2, 4, 6, 7, 8, 15, and 9 using ELISPOT method according to embodiments of the present disclosure.

With reference to the specification in the commercially available ELISPOT kit, the cells cultured in Example 4 and T2 cells loaded with testing polypeptides (polypeptides listed in the first column shown in Table 4 below) and irrelevant polypeptide (referring to a polypeptide not stimulating T cells to secrete IFN-gamma interferon and having a specific sequence of LSYRNKPSI, as a control, the irrelevant polypeptide used in the following examples also refers to this sequence) were added respectively to the ELISPOT plate for cultivation, and ELISPOTs were detected after 20 hours. The results of ELISPOTs are shown in FIG. 4, and the results are summarized in Table 4 below:

TABLE 4

| Polypeptide stimulating specific CD8+T cells to secrete IFN-gamma interferon | | | | |
|---|---|---|---|---|
| Polypeptide | Number of spots produced by using testing polypeptide as stimulant | Number of spots produced by using irrelevant polypeptide as stimulant | Multiple (testing/ irrelevant) | Conclusion |
| VTGAVGVGK | 186 | 4 | 46 | Having immunogenicity |
| VTVGAAGVGK | 38 | 4 | 9 | Having immunogenicity |
| VTVGADGVGK | 62 | 5 | 12 | Having immunogenicity |
| VTVGARGVGK | 22 | 4 | 5 | Having immunogenicity |

TABLE 4-continued

Polypeptide stimulating specific CD8+T cells to secrete IFN-gamma interferon

| Polypeptide | Number of spots produced by using testing polypeptide as stimulant | Number of spots produced by using irrelevant polypeptide as stimulant | Multiple (testing/ irrelevant) | Conclusion |
|---|---|---|---|---|
| VTVGAVGVGK | 60 | 14 | 4 | Having immunogenicity |
| VSVGAVGVGK | 60 | 14 | 4 | Having immunogenicity |
| STIDESPIFK | 22 | 5 | 4 | Having immunogenicity |
| RTIEQLTLK | 24 | 11 | 2 | Having immunogenicity |
| VVVGAGDVGK | 180 | 11 | 16 | Having immunogenicity |
| TTAPFLSGK | 38 | 6 | 6 | Having immunogenicity |

In Table 4, the second row and the third row represent the number of detected spots by using the testing polypeptides as stimulant and the number of detected spots by using the irrelevant polypeptide as stimulant, respectively, and the fourth row indicates a ratio of the number of detected spots by using the polypeptides as stimulant to the number of detected spots by using the irrelevant polypeptide as stimulant. Generally speaking, when the ratio exceeds a certain multiple (>=2), the polypeptide was regarded as having immunogenicity, and the higher the ratio, the stronger the immunogenicity of the polypeptide.

Example 6 Verification of Polypeptide-Specific Killing Activity of CD8+ T Cells by Lactate Dehydrogenase (LDH) Release Assay LDH is an enzyme present in the cytoplasm. LDH will be released into the culture medium when the cell membrane is damaged. Since the released LDH is stable, the measured amount of LDH in the medium can be used as an indicator to measure the number of dead and damaged cells.

The cells cultured in Example 4 were co-cultured with the T2 cells loaded with the testing polypeptides or the irrelevant polypeptide or no polypeptide. In the assay, maximum release wells, volume correction wells, medium control wells, spontaneous release wells, different effect-target ratios (the ratio of the number of T cells to the number of T2 cells) were set, triplicated wells for each group. After 4 hours, 50 l of the co-cultured cell supernatant was taken and added to 50 l of LDH substrate mixture, allowing the cell supernatant to catalyze the LDH substrate reaction, finally reading at the wavelength of 490 nm and the reference wavelength of 680 nm. Based on the control wells, the killing activity of target cells killing T2 cells was calculated. The results are shown in Table 5 below. The greater the value shown in Table 5, the stronger the killing effect.

TABLE 5

T cells specifically recognizing and killing the target cells that present the testing polypeptide

| Polypeptide | | T + T2 + testing polypeptide | | | T + T2 + irrelevant polypeptide | | | T + T2 (loaded with no polypeptide) | | |
|---|---|---|---|---|---|---|---|---|---|---|
| VTGAVG | E:T = 10:1 | 0.265 | 0.27 | 0.279 | 0.236 | 0.24 | 0.246 | 0.201 | 0.214 | 0.203 |
| VGK | E:T = 1:1 | 0.112 | 0.11 | 0.113 | 0.103 | 0.104 | 0.106 | 0.102 | 0.099 | 0.098 |
| VTVGAA | E:T = 10:1 | 0.478 | 0.513 | 0.516 | 0.329 | 0.357 | 0.371 | 0.362 | 0.392 | 0.371 |
| GVGK | E:T = 1:1 | 0.407 | 0.418 | 0.424 | 0.311 | 0.306 | 0.311 | 0.31 | 0.356 | 0.322 |
| VTVGAD | E:T = 10:1 | 0.258 | 0.265 | 0.263 | 0.256 | 0.262 | 0.264 | 0.234 | 0.249 | 0.246 |
| GVGK | E:T = 1:1 | 0.116 | 0.109 | 0.111 | 0.115 | 0.116 | 0.115 | 0.099 | 0.104 | 0.103 |
| VTVGAR | E:T = 10:1 | 0.527 | 0.532 | 0.47 | 0.407 | 0.354 | 0.366 | 0.329 | 0.359 | 0.358 |
| GVGK | E:T = 1:1 | 0.451 | 0.467 | 0.399 | 0.364 | 0.309 | 0.321 | 0.295 | 0.305 | 0.299 |
| VTVGAV | E:T = 10:1 | 0.515 | 0.51 | 0.516 | 0.359 | 0.357 | 0.351 | 0.349 | 0.347 | 0.351 |

TABLE 5-continued

T cells specifically recognizing and killing the target cells that present the testing polypeptide

| Polypeptide | | T + T2 + testing polypeptide | | | T + T2 + irrelevant polypeptide | | | T + T2 (loaded with no polypeptide) | | |
|---|---|---|---|---|---|---|---|---|---|---|
| GVGK | E:T = 1:1 | 0.346 | 0.35 | 0.344 | 0.281 | 0.286 | 0.296 | 0.271 | 0.276 | 0.276 |
| VSVGAV | E:T = 10:1 | 0.716 | 0.835 | 0.809 | 0.679 | 0.719 | 0.752 | 0.771 | 0.648 | 0.583 |
| GVGK | E:T = 1:1 | 0.589 | 0.618 | 0.679 | 0.571 | 0.66 | 0.615 | 0.512 | 0.575 | 0.579 |
| STIDESPI | E:T = 10:1 | 0.188 | 0.188 | 0.192 | 0.192 | 0.198 | 0.201 | 0.183 | 0.183 | 0.179 |
| FK | E:T = 1:1 | 0.107 | 0.094 | 0.099 | 0.114 | 0.114 | 0.114 | 0.102 | 0.098 | 0.099 |
| RTIEQLT | E:T = 10:1 | 0.202 | 0.205 | 0.2 | 0.15 | 0.153 | 0.155 | 0.141 | 0.149 | 0.149 |
| LK | E:T = 1:1 | 0.126 | 0.128 | 0.13 | 0.097 | 0.098 | 0.098 | 0.095 | 0.094 | 0.094 |
| VVVGAG | E:T = 10:1 | 0.202 | 0.205 | 0.2 | 0.175 | 0.18 | 0.177 | 0.171 | 0.172 | 0.167 |
| DVGK | E:T = 1:1 | 0.108 | 0.108 | 0.11 | 0.105 | 0.106 | 0.106 | 0.098 | 0.096 | 0.095 |
| TTAPFLS | E:T = 10:1 | 0.288 | 0.285 | 0.283 | 0.256 | 0.262 | 0.264 | 0.234 | 0.249 | 0.246 |
| GK | E:T = 1:1 | 0.108 | 0.108 | 0.11 | 0.105 | 0.106 | 0.106 | 0.098 | 0.096 | 0.095 |

The results indicate that the CD8+ T cells stimulated by these polypeptides have polypeptide-specific killing activity.

Example 7 Construction of Mouse Subcutaneous Transplanted Tumor Model

In this example, a mouse subcutaneous transplanted tumor model was constructed, and this model was used to verify the tumor control effect of the pharmaceutical combination containing the polypeptide, the antigen-presenting cell, and the vaccine proposed by the present disclosure.
1. The Encoding Gene of Each Polypeptide was Introduced by Lentivirus Transfection, and the Recombinant Lentivirus Expressing Each Polypeptide Sequence was Constructed and Packaged.
2. Construction of Human-Derived Lung Cancer Cell Line Expressing the Polypeptides The human lung cancer cell line HCC827 was purchased from CRL-5922 (No: CRL-2868), and its HLA subtype was HLA-A*1101 positive. Cells were cultured in DMEM medium containing 10% fetal bovine serum, 100 U/mL penicillin and streptomycin, in an incubator at 37° C., 5% $CO_2$. The packaged lentivirus was transfected into the HCC827 cell line, and antibiotic puromycin was used to continuously screen the surviving HCC827 cell line, and finally the HCC827 cell line expressing the polypeptides was established.
3. NOD SCID Mouse Human Immune Reconstitution 600 ml to 900 ml of anticoagulated peripheral blood from healthy volunteers was collected. The PBMCs were separated by Ficoll, and collected for use. 300 NOD SCID mice, in which the immune leakage was excluded, were each intraperitoneally injected with PBMCs ($2*10^7$ cells/0.5 ml) to carry out human immune reconstitution for the NOD SCID mice. After 4 weeks, the mice were selected to be inoculated with a human lung cancer cell line model.
4. Construction of Human Lung Cancer Tumor Model The established human lung cancer cell line was cultured in DMEM medium containing 10% fetal bovine serum, 100 U/mL penicillin and streptomycin, in an incubator at 37° C., 5% $CO_2$. Tumor cells were collected, centrifuged at 3000 rpm, and washed 3 times with sterile saline. The cells were appropriately diluted, and 40 μl of the cell suspension was taken and added to 10 μl of 0.4% tryphenol blue for staining and counting by microscopy, to prepare a tumor cell suspension with a concentration of $1*10^8$ cells/ml. The NOD/SCID mice after immune reconstitution were selected and each subcutaneously inoculated with 100 ml of the tumor cell suspension. After the inoculation was completed, the inoculation site was observed every day to determine whether infection occurred and whether the tumor regressed naturally after growth. After 7 days, a tumor with a size of about a rice grain under the skin of the mouse can be palpated. The subcutaneous tumor model NOD/SCID mice with immune reconstitution for 4 weeks were treated with DC vaccine, and the volume of the tumor was recorded every 3 to 4 days.

Example 8 Schemes of Preparation and Treatment of Polypeptide Vaccine

The HCC827 subcutaneous tumor model NOD/SCID mice with immune reconstitution for 4 weeks were randomly divided into 4 groups: a wild-type polypeptide combination group, an adjuvant group, an adjuvant+core polypeptide group, and an adjuvant+polypeptide combination group, each group including 6 mice.

The wild-type polypeptide combination group refers to an equal-mass mixture of wild-type polypeptides corresponding to respective core polypeptides and high-frequency mutant polypeptides.

The adjuvant group refers to only adjuvant without adding any polypeptide.

The adjuvant+core polypeptide group refers to adjuvant+core polypeptides (SEQ ID NO: 1 to SEQ ID NO: 6, equal mass mixture).

The adjuvant+polypeptide combination group refers to adjuvant+core polypeptides (SEQ ID NO: 1 to SEQ ID NO: 6, equal mass mixture)+high-frequency mutant polypeptides (SEQ ID NO: 7 to SEQ ID NO: 15, equal mass mixture).

Figure 5:
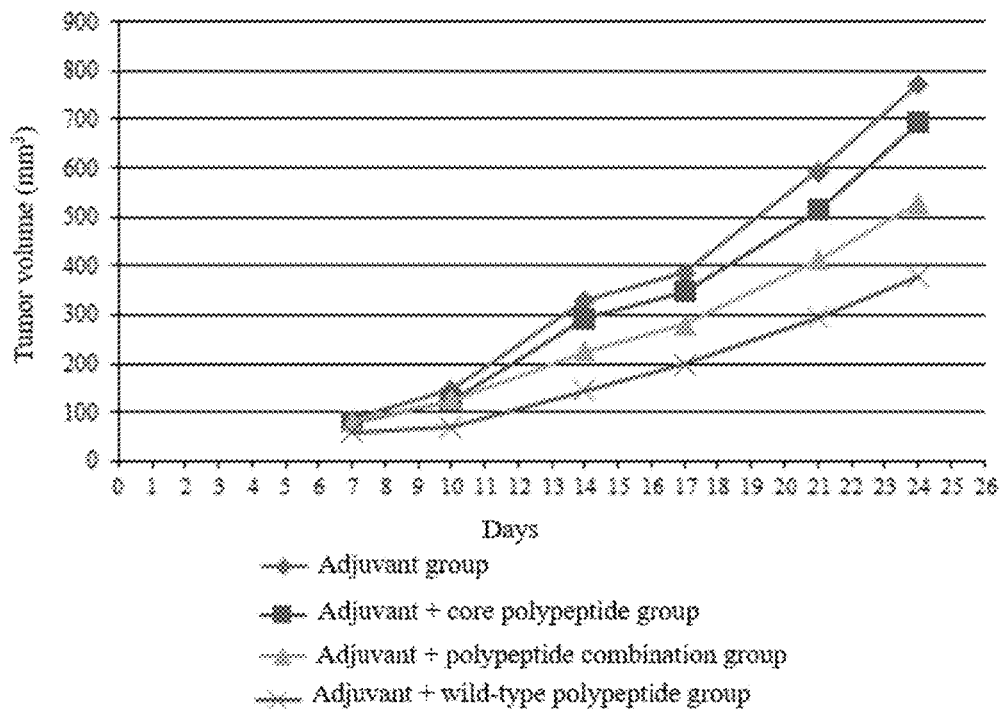
FIG. 5 illustrates a result graph of inhibition of mouse tumor growth by polypeptide vaccines according to embodiments of the present disclosure.

The first immune dosage of the wild-type polypeptide combination and the polypeptide combination was 100 ml per mouse. The above polypeptides were resuspended in PBS, mixed evenly with Freund's complete adjuvant (150 ml per mouse), adjusted with PBS to 300 ml per mouse, and subcutaneously injected on the back at two points. After 2 weeks, the same dosage was used for booster immunization (Freund's complete adjuvant was used for the first immunization, and Freund's incomplete adjuvant was used for all subsequent immunizations), for a total of 4 times of immunization. After the injection, the vital signs of the mice were observed, and the vertical and horizontal sizes of the tumor were measured with a vernier caliper every 3 to 4 days. The tumor volume was calculated in accordance with: tumor volume=1/2*length*width$^2$. At the same time, the changes in the body weight of the mice were recorded. The results are shown in FIG. 5.

The results indicate that, compared with the wild-type polypeptide-loaded polypeptide vaccine group and the adjuvant group, the core polypeptide-loaded or polypeptide combination-loaded polypeptide vaccine group can significantly slow down the mouse tumor growth, and the polypeptide combination-loaded polypeptide vaccine group has significantly stronger effect of slowing down the mouse tumor growth.

Figure 6:
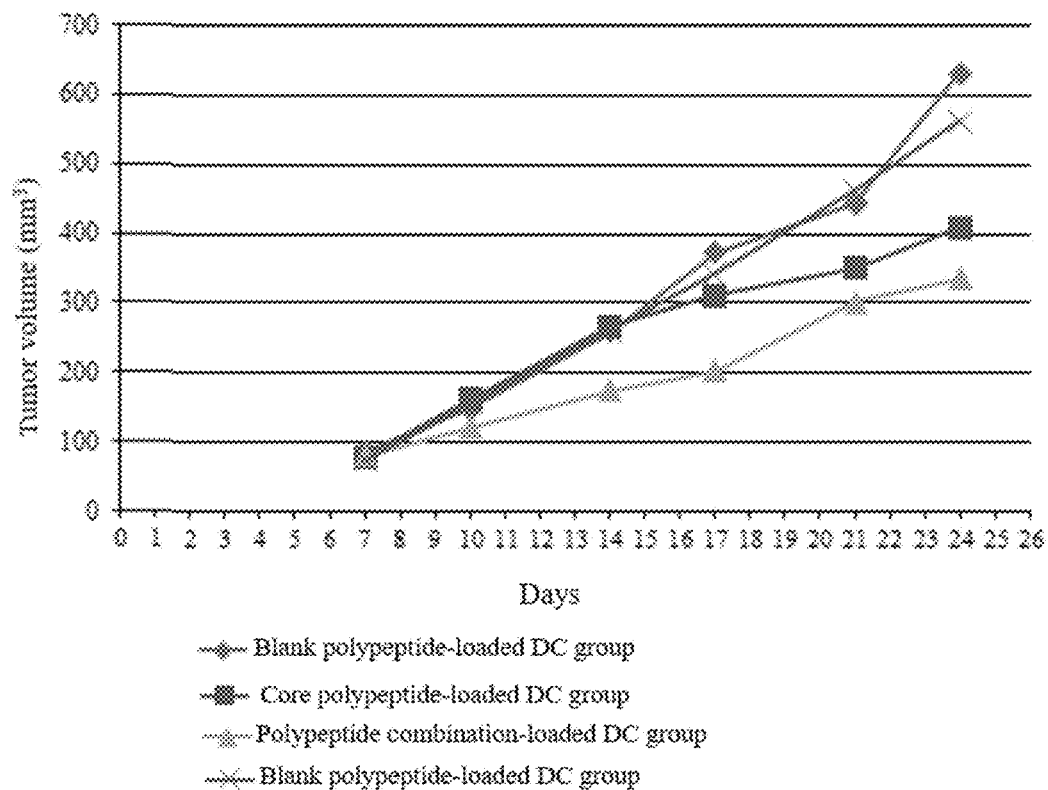
FIG. 6 illustrates a result graph of inhibition of mouse tumor growth by polypeptide DC vaccines according to embodiments of the present disclosure.

Example 9 Schemes of Preparation and Treatment of DC Polypeptide Vaccine 100 ml to 150 ml of anticoagulated peripheral blood from healthy volunteers was collected. The PBMCs were separated by Ficoll, and collected for use. The PBMCs were resuspended in RPMI 1640 medium at 2 to 3*10$^6$ cells/ml and incubated at 37° C. for 2 h. The adherent cells were DC cells, while the non-adherent cells, i.e., the peripheral blood lymphocytes (PBLs), were sucked and collected for use. The adherent mononuclear cells were induced to immature DC cells by using GM-CSF (1000 U/ml) and IL-4 (1000 U/ml). Then, IFN-gamma (100 U/ml) and CD40L (10 ng/ml) were added, and finally, the wild-type polypeptide combination and the mutant polypeptide combination (with a concentration of 10 micrograms/ml) were added respectively to induce the adherent cells to the mature DC cells. The mature DC cells were harvested and washed 3 times with normal saline. The DC cells loaded with polypeptide were adjusted with normal saline to a concentration of (4.0±0.5)*10$^7$ cells/ml for subsequent experiments. The mice were randomly divided into 4 groups: a wild-type polypeptide-loaded DC group (equal mass mixture of wild-type polypeptides corresponding to respective core polypeptides and high-frequency mutant polypeptides), a core polypeptide-loaded DC group (SEQ ID NO: 1 to SEQ ID NO: 6, equal mass mixture), a polypeptide combination-loaded DC group (SEQ ID NO: 1 to SEQ ID NO: 15, equal mass mixture), and a blank polypeptide group (loaded with no polypeptide), each group containing 6 mice. A cell suspension of DC cells loaded with wild-type polypeptides, a cell suspension of DC cells loaded with mutant polypeptides, and a cell suspension of DC cells loaded with no polypeptide were prepared. The mice were injected intradermally in the inner thighs near the groin, with 0.1 ml per thigh, injected once a week. The dosage was (4.0±0.5)*10$^6$ cells/time, 2 injections in total. After the injections, the vital signs of the mice were observed, and the vertical and horizontal sizes of the tumor were measured with a vernier caliper every 3 to 4 days. The tumor volume was calculated in accordance with: tumor volume=1/2*length*width$^2$. At the same time, the changes in the body weight of the mice were recorded. The results are shown in FIG. 6.

The results indicate that, compared with the wild-type polypeptide-loaded DC vaccine group and the blank polypeptide-loaded DC vaccine group, the core polypeptide-loaded or polypeptide combination-loaded DC vaccine group can significantly slow down the tumor growth in mice, and the polypeptide combination-loaded DC vaccine group has significantly stronger effect of slowing down the tumor growth in mice.

Figure 7:
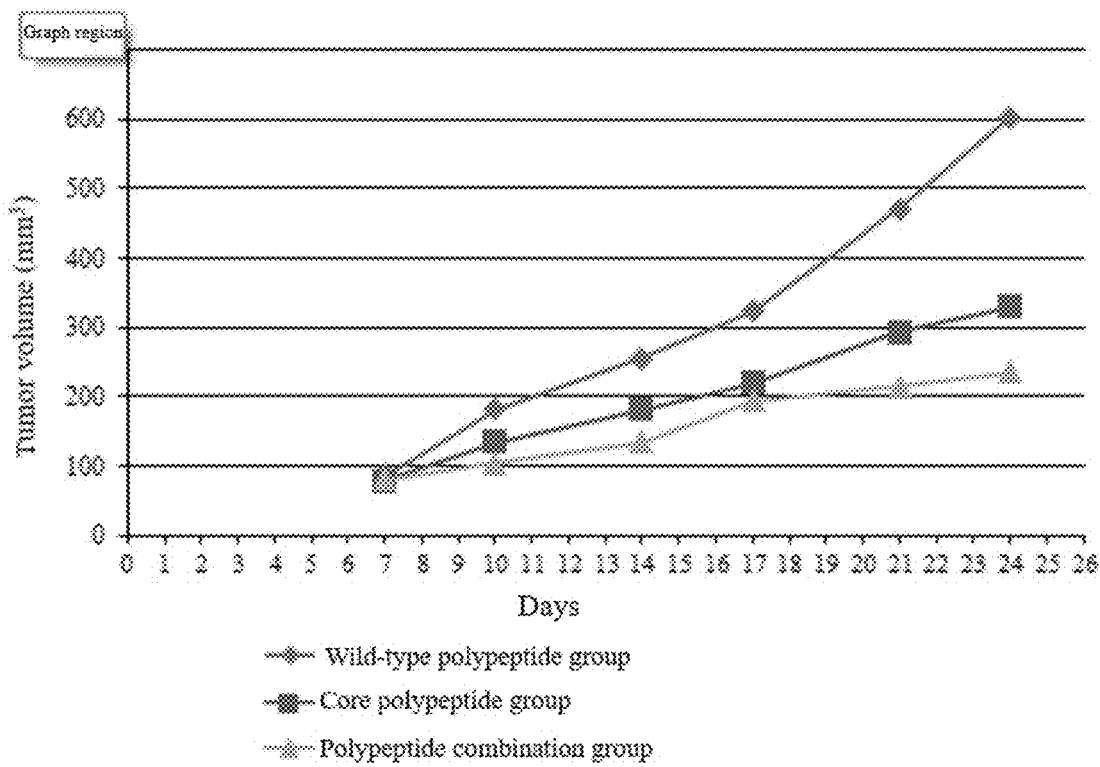
FIG. 7 illustrates a result graph of inhibition of mouse tumor growth by DC-CTL vaccines according to embodiments of the present disclosure.

Example 10 Schemes of Preparation and Treatment of Lentivirus-Infected DC Cell Vaccine 100 ml to 150 ml of anticoagulated peripheral blood from healthy volunteers was collected. The PBMCs were separated by Ficoll, and collected and incubated at 37° C. for 2 h, then the non-adherent cells were washed away, and DC cells were cultured with recombinant human granulocyte-macrophage colony-stimulating factor (rhGM-CSF) and recombinant human interleukin-4 (rhIL-4). On day 5 of the culture, a half-appropriate amount of medium was replaced, and the cell density was adjusted to 1*10$^6$ cells/ml. Then, the lentiviral solution containing an appropriate amount of wild-type polypeptides, lentiviral solution containing an appropriate amount of core polypeptides, and lentiviral solution containing an appropriate amount of the polypeptide combination constructed and expressed in Example 7 were added respectively. After 24 hours, the virus culture medium was removed, and the culture medium containing 50 ng/ml rhIL-4, 100 ng/ml rhGM-CSF, 100 U/ml IFNγ and 100 U/ml CD40L was added, and cultured in an incubator at 37° C., with 5% CO$_2$. After 48 h to 72 h, the lentivirus-infected DC cells were observed under a fluorescence microscope, and mature DC cells were collected, washed 3 times with normal saline, and adjusted to a density of DC cells of (4.0±0.5)*10$^7$ cells/ml for subsequent experiments. The mice were randomly divided into 3 groups, i.e., a wild-type polypeptide (equal mass mixture of wild-type polypeptides corresponding to respective core polypeptides and high-frequency mutant polypeptides)-DC group, a core polypeptide (SEQ ID NO: 1 to SEQ ID NO: 6, equal mass mixture)-DC group, and a polypeptide combination (SEQ ID NO: 1 to SEQ ID NO: 15, equal mass mixture)-DC group, each group containing 6 mice. Cell suspension of DC cells loaded with wild-type polypeptides and cell suspension of DC cells loaded with mutant polypeptides were prepared. The mice were injected intradermally at the inner thighs near the groin, with 0.1 ml per thigh, injected once a week. The dosage was (4.0±0.5)*10$^6$ cells/time, 2 injections in total. After the injections, the vital signs of the mice were observed, and the vertical and horizontal sizes of the tumor were measured with a vernier caliper every 3 to 4 days. The tumor volume was calculated in accordance with: tumor volume=1/2*length*width$^2$. At the same time, the changes in the body weight of the mice were recorded. The results are shown in FIG. 7.

The results indicate that, compared with the wild-type polypeptide control group, the gene-packaged lentivirus-infected DC vaccine expressing the core polypeptides or the polypeptide combination can significantly slow down the mouse tumor growth, and the gene-packaged lentivirus-infected DC vaccine expressing the polypeptide combination has the significantly stronger effect of slowing down the tumor growth in mice.

Example 10 Schemes of Preparation and Treatment of Polypeptide-Specific DC-CTL Vaccine The PBLs collected in Example 9 were sorted by magnetic beads to obtain CD8$^+$ T cells. The CD8$^+$ T cells were co-incubated and sensitized with DC cells loaded with blank polypeptides, DC cells loaded with wild-type polypeptides (equal mass mixture of wild-type polypeptides corresponding to the core polypeptides and the high-frequency mutant polypeptides), DC cells loaded with core polypeptides (equal mass mixture of SEQ ID NO: 1 to SEQ ID NO: 6) and DC cells loaded with polypeptide combination (equal mass mixture of SEQ ID NO: 1 to SEQ ID NO: 15), at a cell ratio of DC cells:CD8$^+$ T cells=1:4. The culture medium was incubated with 500 IU/ml IL-2 and 50 ng/ml IL-7, in an incubator at 37° C. with 5% $CO_2$, and the cells were counted after 1 week of culture. In the second week, a second round of stimulation was performed with the DC cells loaded with blank polypeptide, the DC cells loaded with the wild-type polypeptides, the DC cells loaded with the core polypeptides, and the DC cells loaded with polypeptide combination. A total of three rounds of stimulation was performed, and the medium was appropriately added during the culture. On day 0, day 7, day 14 and day 21 of the culture, the number of lymphocytes was counted, and the cell proliferation index (PI) was calculated, where PI=the number of cells after proliferation/the number of inoculated cells. Cytotoxic Tlymphocytes (CTLs) were harvested after 21 days of culture. The cells were resuspended with normal saline, and the resuspended volume was 0.2 ml, and were reinfused through the tail vein. The number of cells reinfused in each tumor model mouse was about 1*10$^8$ cells. After the injection, the vital signs of the mice were observed, and the vertical and horizontal sizes of the tumor were measured with a vernier caliper every 3 to 4 days. The tumor volume was calculated in accordance with: tumor volume=1/2*length*width$^2$. At the same time, the changes in the body weight of the mice were recorded.

The results indicate that, compared with the blank polypeptide control group and the wild-type polypeptide group, the DC-CTL vaccine activated by the core polypeptides or the polypeptide combination can significantly slow down the mouse tumor growth, and the DC-CTL vaccine activated by the polypeptide combination has the significantly stronger effect of slowing down the mouse tumor growth.

In this specification, description reference to the terms "one embodiment", "some embodiments", "example", "specific example", or "some examples" or the like mean that the specific features, structures, materials, or characteristics of the present disclosure described in conjunction with the embodiment or example are included in at least one embodiment or example of the present disclosure. In this specification, schematic representations of the above terms are not necessarily directed to the same embodiment or example. Furthermore, the particular features, structures, materials or characteristics as described may be combined in any suitable manner in any one or more embodiments or examples. Furthermore, those skilled in the art may combine different embodiments or examples described in this specification as well as the features of the different embodiments or examples, as long as they are not contradictory.

Although the embodiments of the present disclosure have been illustrated and described above, it should be understood that the above-mentioned embodiments are exemplary and shall not be construed as limitations to the present disclosure. Those skilled in the art can make variations, modifications, substitutions, and alterations to the above-described embodiments within the scope of the present disclosure.

What is claimed is:

1. A construct, comprising:
a nucleic acid encoding a group of separate polypeptides, wherein the group of separate polypeptides comprises at least three polypeptides selected from the group consisting of amino acid sequences set forth in SEQ ID NO: 1 to SEQ ID NO: 6, wherein the at least three polypeptides have separate amino acid sequences; and
a control sequence,
wherein the control sequence is operably linked to the nucleic acid.

2. An expression vector, comprising the construct according to claim 1.

3. A host cell, containing the construct according to claim 1.

4. A pharmaceutical composition, comprising:
a polypeptide encoded by the nucleic acid of the construct according to claim 1; and
a pharmaceutically acceptable excipient.

5. An antigen-presenting cell containing the construct according to claim 1, presenting the polypeptides encoded by the nucleic acid of the construct according to claim 1.

6. A tumor vaccine, comprising the group of separate polypeptides encoded by the nucleic acid of the construct according to claim 1.

7. A method for treating a patient suffering from a tumor expressing at least one of mutant KRAS, GLCE, ARHGEF11, CTNNBA, LIN7A, CDH1, GATA3, CTNNB1, or TP53, comprising:
administering an effective amount of the pharmaceutical composition according to claim 4.

8. A tumor vaccine, comprising the construct according to claim 1.

9. A tumor vaccine, comprising the expression vector according to claim 2.

10. A tumor vaccine, comprising the host cell according to claim 3.

11. A tumor vaccine, comprising the antigen-presenting cell according to claim 5.

12. A method for treating a patient suffering from a tumor expressing at least one of mutant KRAS, GLCE, ARHGEF11, CTNNBA, LIN7A, CDH1, GATA3, CTNNB1, or TP53, comprising:
administering an effective amount of the tumor vaccine according to claim 6 to the patient.

13. The construct according to claim 1, wherein the group of separate polypeptides further comprises at least one polypeptide selected from the group consisting of amino acid sequences set forth in SEQ ID NO: 7 to SEQ ID NO: 15.

14. The construct according to claim 1, wherein the group of separate polypeptides comprises each polypeptide consisting of amino acid sequences set forth in SEQ ID NO: 1 to SEQ ID NO: 6.

15. The construct according to claim 14, wherein the group of separate polypeptides further comprises each polypeptide consisting of amino acid sequences set forth in SEQ ID NO: 7 to SEQ ID NO: 15.

* * * * *